June 9, 1959     R. B. FRENCH     2,889,994

LIQUID LAWN FEEDER

Filed Nov. 21, 1957

INVENTOR.
RUSSELL B. FRENCH
BY

United States Patent Office 2,889,994
Patented June 9, 1959

2,889,994

LIQUID LAWN FEEDER

Russell B. French, Darien, Conn., assignor to Olin Mathieson Chemical Corporation, a corporation of Virginia Application November 21, 1957, Serial No. 697,959

2 Claims. (Cl. 239—159)

The present invention relates to fertilizer dispensers and in particular to fluid fertilizer dispensers operable to discharge fertilizer material in fluid form upon lawns or turf.

A feature of the present invention is the provision of a mobile lawn feeder operable to discharge a uniform spray of liquid fertilizer directly upon the turf.

Another feature of the invention is the provision of a mobile lawn feeder whose structure lends itself readily to mass production methods.

A still further feature of the invention is the provision of a lawn feeder which is readily packaged.

A further feature of the invention is the provision of a liquid lawn feeder which is quickly and easily assembled.

A mobile liquid lawn feeder embracing certain features of the present invention may comprise a tubular frame element of the present invention may comprise a tubular frame element effective to serve as a conduit for fluids, said tubular element having a coupling adapted to connect with a source of fluid under pressure, at least one wheel mounted on the tubular element and operable to make rolling contact with the earth, a plurality of spaced apertures formed in the tube and in the region thereof occupied by said wheel, at least one stiffening rod connected to said frame and terminating in a hook, said hook being operable to support a fluid container, a conduit communicating with the interior of the container and the interior of the tubular element operable when the fluid is forced through said tubular frame to effect a vacuum in the container with the result that a mixture of fluid from said source and fluid material contained within said container is discharged from the apertures as the feeder is rolled along the lawn.

Other features and advantages of the present invention will become more apparent from a study of the succeeding specification when read in conjunction with the appended drawings, in which.

Figure 3:
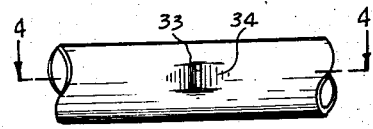
Fig. 3 is a view of a portion of the sprinkler section of the tube disposed between the wheels and as viewed from the underside thereof; and, Fig. 4 is a sectional view of the showing of Fig. 3 as viewed in the plane of the line 4—4.

Referring now in detail to the drawings there is shown a tubular frame element 10 having a segment 11 thereof telescoped into a complementary segment 12. The tube segments make a fluid tight connection. The length of tubing 12 is formed with a bend as at 13 and carries a pair of wheels 14 and 16. The wheel 14 is maintained in a spaced relationship with respect to the wheel 16 by means of a pair of set screws 17 (only one shown) in threaded engagement with the tube. The set screws are disposed on opposite sides of the wheel and are provided with suitable resilient washers 18 to make a fluid tight seal with the tube segment 12.

Figure 2:
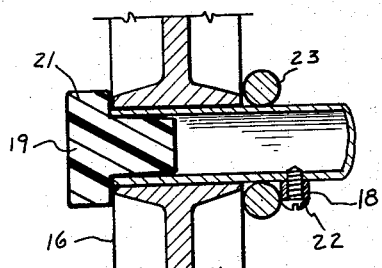
Fig. 2 is a sectional view through the left wheel of the feeder shown in Fig. 1 illustrating the scheme for mounting the wheel.

As is more apparent in Fig. 2, the wheel 16 is held in position by the cooperation between a plug 19 having a flange 21 and a set screw 22 having washer 18. In addition to serving as a retainer for the wheel 16 the plug 19 operates to enclose the end of the tube 12.

Figure 1:
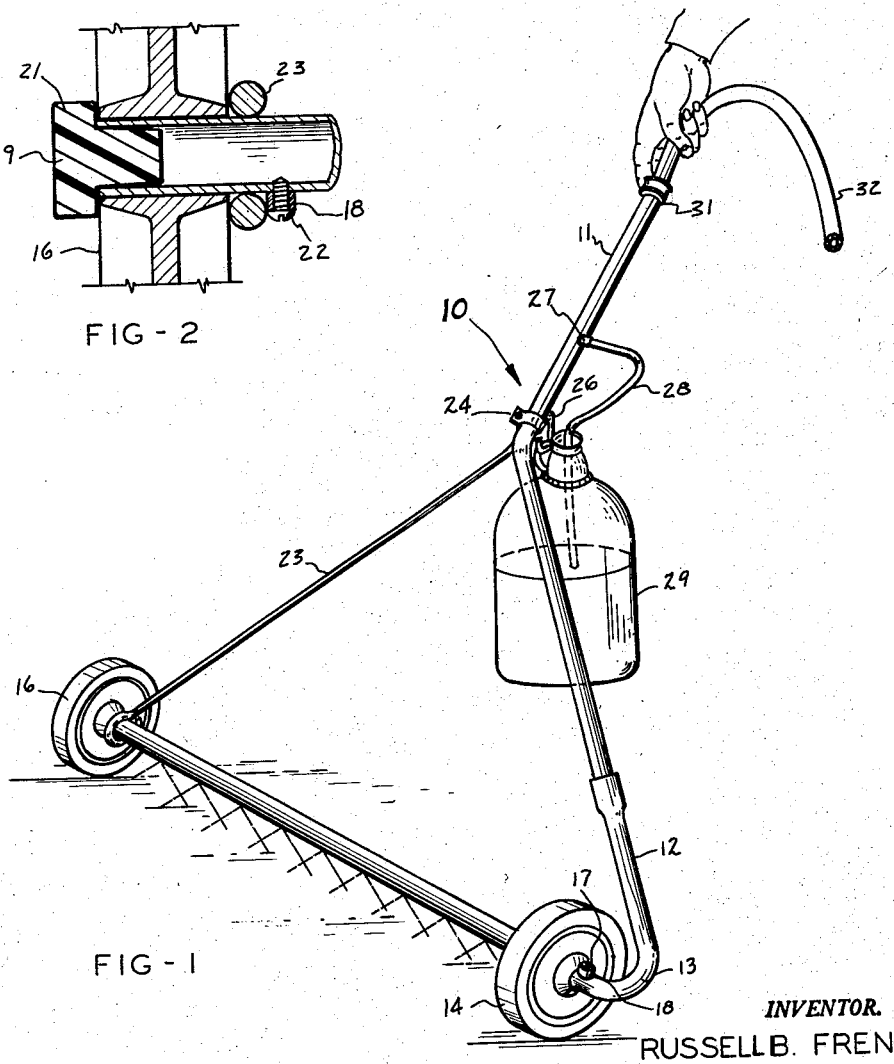
Fig. 1 is a perspective view of a mobile lawn feeder embracing the principles of the present invention.

Disposed between the set screw 22 and the wheel 16 is a stiffening rod 23. The rod, rigidly connected to the tube segment 11 by means of a clamp 24, terminates in an open hook 26. The opposite end of the rod snugly encircles the tube segment 12 as shown in Fig. 2. The rod acts as a strengthening element completing the third leg of a triangle in cooperation with the tube segments 11 and 12. The hook 26 effects a mounting bracket receiving the loop portion of a conventional gallon jug 29, or the like, as shown in Fig. 1.

The length of tubing 11 is fitted with a nipple 27 communicating with the interior of the tubing. A flexible hose 28 provides a conduit from the interior of the container 29 to the interior of the tubular frame 10. The upper end of the composite tube 10 is formed with a conventional garden hose coupling as at 31 making a threaded connection with a garden hose 32.

Figure 4:
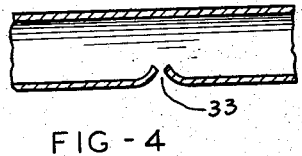

The portion of the tube segment 12 which is disposed between the wheels 14 and 16 is formed on the underside thereof with a plurality of spaced openings 33. As is apparent in Figs. 3 and 4, the openings are generally rectangular in cross section with the long side of the opening being disposed generally transverse with respect to the longitudinal axis of the tube. The surface of the tubing immediately adjacent the long side of the rectangular opening is dimpled inwardly as at 34. The dimpled conformation in cooperation with the disposition of the rectangular slot 33 results in the generation of a fan shaped fluid discharge from each opening as is apparent in Fig. 1. Stated otherwise, the fluid discharge from the openings 33 emerges in what might be described as a downwardly flaring fan shaped sheet or film where the adjacent openings produce sheets of fluid which overlap one another thus insuring uniform coverage of the soil as the feeder is rolled therealong.

The feeder operates in the following manner:

The garden hose 32 is connected to the tube segment 11 and to a suitable source of domestic water and the container 29 is filled with a suitable liquid fertilizer. Upon introduction of the domestic water into the garden hose 32 and thus into the tubular frame 10 the water flows through the segments 11 and 12 and fluid is discharged throught the openings 33 in the manner previously described.

The siphon or Venturi effect created by the domestic water as it flows past the nipple 27 develops a vacuum in the conduit 28 sufficient to lift fertilizer fluid from the container 29. As the domestic water and fertilizer concentrate proceed through the tubular frame 10 to the orifices 33, a dilute mixture of liquid fertilizer is formed which is ultimately discharged upon the lawn.

It is noted that a suitable check valve is advisable disposed between the nipple 27 and the garden hose 32 in order to avoid a back draft of fertilizer into the domestic water system.

Particular attention is directed to the fact that the liquid lawn feeder embracing the principles of the present invention is readily packaged in "knocked-down" condition.

Furthermore, the device is quickly assembled wherein (1) tube segments 11 and 12 are pushed together into a telescoping relationship, (2) wheel 14 is mounted upon tube segment 12 and is secured in place by set screws 17, (3) stiffening rod 23 is connected to the tube segment 11 by means of the clamp 24 while the looped opposite end receives the free end of tube segment 12, and (4)

next the wheel 16 is mounted upon the segment 12 and held in place by the plug 19 on one side and the set screw 22 on the other side.

It is anticipated that a wide variety of modifications and changes may be devised without departing from the spirit and scope of the present invention.

For example, the lawn feeder may be arranged with a single wheel centrally disposed with respect to the dispensing portion thereof; the overall tubular frame being T-shaped and having a pair of symmetrical stiffening rods connecting with the tubular frame to define two right triangles.

What is claimed is:

1. A mobile liquid lawn feeder comprising a tubular element and a stiffening rod, said tubular element being operable to serve as a conduit for fluids, said rod and said element being connected together to form a triangle, one end of said tubular element having a coupling adapted to connect with a conventional garden hose, the other end of said element being closed by a flanged plug, a pair of spaced wheels mounted on said tubular element and operable to make rolling contact with the earth, one of said wheels being retained on said tube by said flanged plug, a plurality of spaced apertures formed in said tube and in the region thereof bounded by said wheels, a hook formed on said rod for supporting a fluid container, conduit means communicating with the interior of the container and the interior of the tubular element operable when water is forced through said tubular frame to effect a vacuum in the container with the result that a mixture of water and material contained within said container is discharged from said apertures as the feeder is propelled along the lawn.

2. A mobile liquid lawn feeder comprising a tubular frame element formed with at least one bend and operable to serve as a conduit for fluids, said tubular element having a coupling operable to connect with a conventional garden hose, at least one wheel mounted on said element and operable to make rolling contact with the earth, a plurality of spaced apertures formed in said element and in the region thereof occupied by said wheel, a stiffening rod connected to said frame element and terminating in a hook, said hook being operable to support a fluid container, said tubular element being connected to said stiffening rod to form a generally triangular structure and conduit means communicating with the interior of the container and the interior of the tubular frame element operable when water is forced through said tubular frame to effect a vacuum in the container with the result that a mixture of water and of material contained within said container is discharged from said apertures as the feeder is rolled along the earth.

References Cited in the file of this patent

UNITED STATES PATENTS

| | | |
|---|---|---|
| 1,927,315 | Kamp | Sept. 19, 1933 |
| 2,351,507 | Hallock | June 13, 1944 |
| 2,592,884 | Fox et al. | Apr. 15, 1952 |
| 2,594,476 | Miller | Apr. 29, 1952 |
| 2,784,030 | Dietzel | Mar. 5, 1957 |